United States Patent [19]

Dechovich

[11] Patent Number: 5,582,929
[45] Date of Patent: Dec. 10, 1996

[54] ELECTROLYTE COOLING DEVICE FOR USE WITH A METAL-AIR BATTERY

[75] Inventor: Boris Dechovich, Jerusalem, Israel

[73] Assignee: Electric Fuel (E.F.L.) Ltd., Jerusalem, Israel

[21] Appl. No.: 307,507

[22] Filed: Sep. 16, 1994

[51] Int. Cl.$^6$ .................................................. H01M 8/12
[52] U.S. Cl. ................ 429/26; 429/72; 429/120
[58] Field of Search ................................ 429/120, 26, 27, 429/71, 72, 14

[56] References Cited

U.S. PATENT DOCUMENTS

| | | | |
|---|---|---|---|
| 3,290,176 | 12/1966 | Berju | 429/67 |
| 3,554,810 | 11/1971 | Zaromb | 429/22 |
| 3,788,899 | 1/1974 | Zaromb | 429/26 |
| 3,915,745 | 10/1975 | Ikeda | 429/15 |
| 3,928,080 | 12/1975 | Aronson | 429/81 |
| 4,490,443 | 12/1984 | Ruch | 429/27 |
| 4,559,113 | 12/1985 | Bus | 205/130 |
| 5,093,213 | 3/1992 | O'Callaghan | 429/27 |

*Primary Examiner*—John Niebling
*Assistant Examiner*—Brendan Mee
*Attorney, Agent, or Firm*—Helfgott & Karas, PC

[57] ABSTRACT

The invention provides an electrolyte cooling device for use in combination with a multi-cell metal-air battery, the device comprising an electrolyte reservoir divided into a smaller compartment and a larger compartment, the compartments being connected by a valve arranged to periodically allow flow of electrolyte from the smaller compartment to the larger compartment; a warm electrolyte liquid flow path leading from an electrolyte-holding volume of each cell of the battery to an inlet port of the smaller compartment; a cooled electrolyte liquid flow path leading from an outlet port of the larger compartment to the electrolyte-holding volume of each said cell of the battery; at least one cooling fluid conduit passing through the smaller compartment; and pumping means for circulating a cooling fluid through the conduit and through radiator means arranged for the disposal therefrom of heat.

5 Claims, 3 Drawing Sheets

ELECTROLYTE COOLING DEVICE FOR USE WITH A METAL-AIR BATTERY

BACKGROUND AND SUMMARY OF THE INVENTION

The present invention relates to a battery cooling device.

More particularly, the present invention provides an efficient electrolyte circulation and cooling device which is suitable for dissipating heat from a metal-air battery intended for vehicle propulsion.

All electric batteries generate heat during operation, one source thereof being the chemical reaction taking place in the cells, and the second source being the current flow meeting the ohmic resistance of the battery itself. In most batteries, such heat is dissipated naturally, mainly by convection. However, batteries designed to power electric vehicles are designed to provide high power from a compact battery envelope, and may exhibit a high temperature rise if no additional provision is made for cooling. Further aggravating the problem is the consideration that road vehicles need to be designed to allow operation in ambient temperatures as high as 45°–50° C.; under such conditions, the generated heat may raise battery temperature to a level causing irreversible battery damage.

While a high operating temperature is not necessarily detrimental to battery performance, there are several reasons justifying some cooling arrangement in a battery of this type. First, in a naturally cooled battery, the inner cells will operate at a considerably higher temperature than those on the battery perimeter, leading to operating differentials between the cells. Second, the temperature may rise above that allowed for the plastic parts of the cell, or for the electrolyte. Third, it is often advantageous to use the heat removed from the battery for heating the passenger compartment of the vehicle, when required.

Cooling systems for electric batteries are described in U.S. Pat. Nos. 754,969; 3,767,468; 4,007,315; 4,463,064; 4,578,324; 4,925,744; and 5,212,024. These specifications disclose various systems for circulating a cooling gas such as air, or a liquid such as water, through the battery for removing heat therefrom.

As metal-air batteries contain an electrolyte in liquid form, such batteries can conveniently be cooled by circulating this electrolyte through some form of cooling system.

With regard to a cooling system for a battery intended for use for the propulsion of automobiles and vans, it is important that the weight, and to some extent, also the bulk of such a system, be kept to a minimum, due to the fact that the battery and its auxilliaries should be as lightweight and Compact as possible, for given vehicle/performance requirements.

In a cooling system, the heat transfer coefficient achieved in a tube coil or heat exchanger is directly proportional to the temperature difference between the cooling fluid or gas and the liquid being cooled, in the present case, the electrolyte. It follows that a compact, light-weight system can be constructed where it can be arranged that such a temperature differential is high. A practical way of achieving this end is to circulate the hot electrolyte from the cells into a small, separate compartment and there to transfer some of its heat to the cooling fluid passing therethrough for external dissipation.

It is therefore one of the objectives of the present invention to obviate the disadvantages of the prior art electrolyte cooling devices, and to provide a cooling device which will efficiently achieve its function with the addition to the battery of only minimal weight and bulk.

The present invention achieves said objective by providing an electrolyte cooling device for use in combination with a multi-cell metal-air battery, said device comprising an electrolyte reservoir divided into a smaller first compartment and a larger second compartment, said compartments being connected by a valve arranged to periodically allow flow of electrolyte from said smaller compartment to said larger compartment; a warm electrolyte liquid flow path leading from an electrolyte-holding volume of each cell of said battery to an inlet port of said smaller compartment; a cooled electrolyte liquid flow path leading from an outlet port of said larger compartment to said electrolyte-holding volume of each said cell; at least one cooling fluid conduit passing through said smaller compartment; and pumping means for circulating a cooling fluid through said conduit and through radiator means arranged for the disposal therefrom of heat.

In a preferred embodiment of the present invention, there is provided an electrolyte cooling device wherein said larger compartment comprises a gas-tight vessel in fluid communication with air compression means for effecting circulation of said electrolyte.

Preferably, said air compression means comprises an inlet in said larger compartment for supplying compressed air thereto, whereby, after closure of said valve, increased air pressure in said larger compartment drives electrolyte therefrom into each said cell.

In a most preferred embodiment of the present invention, there is provided an electrolyte cooling device wherein said hot electrolyte liquid flow path is in the form of an unequal-leg inverse U, the upper bend of said U being a small tank exposed to air pressure in the cell, whereby said flow path is arranged for entry of hot electrolyte from said electrolyte-holding volume of each cell of said battery into the open lower portion of the shorter leg of said U, said electrolyte being pressured to flow upwards into said small tank, from which said electrolyte enters the upper opening of the longer leg of said U and flows down said longer leg under gravity to enter said smaller compartment through said inlet port.

A metal-air battery and an electrolyte circulation system used for the cooling thereof is described and claimed in U.S. Pat. No. 5,093,213. The system described therein includes an electrolyte reservoir which is divided into compartments by a divider wall, the top of said divider wall forming an overflow weir. The aim is to allow liquid electrolyte to flow over the weir but to retain solid waste products, such as metal hydroxide, for later removal from the bottom of the reservoir. The division of the reservoir into compartments by said dividing wall is only up to part of the height of the reservoir, the weir providing overflow from one compartment to the other. Furthermore, the divider wall of said patent is not used to improve cooling.

Said patent also envisages the use of one or several electric pumps for achieving circulation, and electrically-driven air fans are provided to cool the heat exchanger. An auxiliary battery is required for starting. The device described in said patent is quite complex, with attendant cost, weight and reliability penalties.

A further system provided with a divided reservoir is described in U.S. Pat. No. 3,290,176. In this device, three electrolyte reservoir compartments are formed by two partitions, but these partitions have a small lower space interconnecting the compartments. Thus, electrolyte may flow under said partitions in either direction, and therefore the device of this patent does not provide for the efficient, batch-like cooling of aliquot portions of electrolyte, as provided by the system of the present invention.

The invention will be described in connection with certain preferred embodiments with reference to the following illustrative figures so that it may be more fully understood.

With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
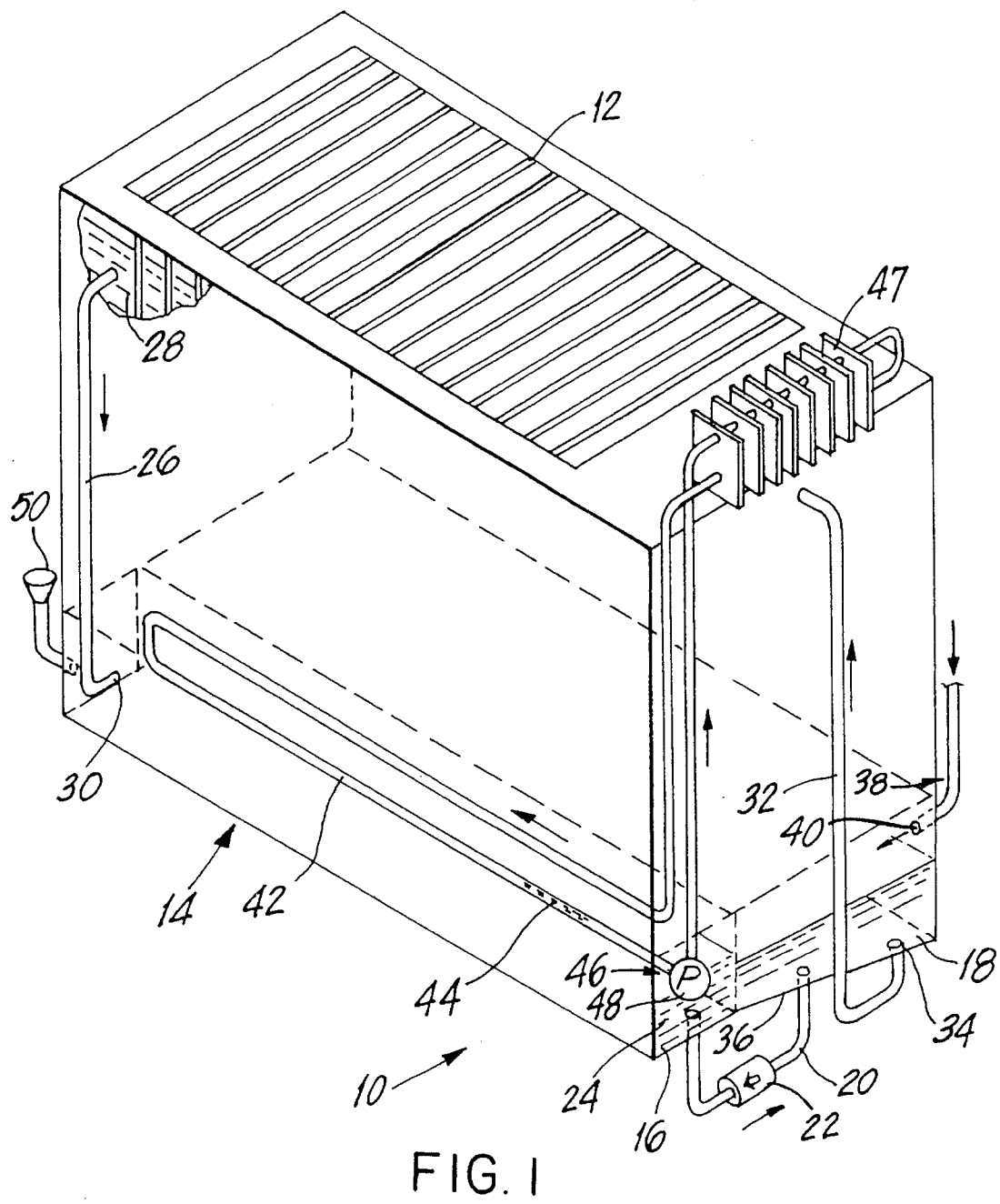
FIG. 1 is a partial schematic view of a preferred embodiment of the cooling device according to the invention.

There is seen in FIG. 1 an electrolyte cooling device 10 for use in combination with a multi-cell metal-air battery 12, typically a zinc-air battery used for road vehicle propulsion.

An electrolyte reservoir 14, suitably made from a strong, alkali-resistant, light-weight material, for example, a reinforced polypropylene, is divided into a smaller compartment 16 and a larger compartment 18. A conduit 20 connects these compartments and includes a valve 22 to periodically allow flow of electrolyte 24 only from the smaller compartment 16 to the larger compartment 18. Conduit 20 is shown for reasons of clarity outside the reservoir 14, but said conduit can be positioned internally. The valve 22 is operated by an external control. In a further embodiment, the valve 22 is a one-way valve operated by hydrostatic pressure of the electrolyte in the smaller compartment 16. The electrolyte 24 used in battery 12 typically comprises a potassium hydroxide solution.

A warm electrolyte liquid flow path 26 leads from an electrolyte-holding volume 28 of cell 12 to an inlet port 30 of smaller compartment 16. To return electrolyte to cell 12, a cooled electrolyte liquid flow path 32 leads from an outlet port 34 of the larger compartment 18 to the electrolyte-holding volume 28 of cell 12.

Figure 4:
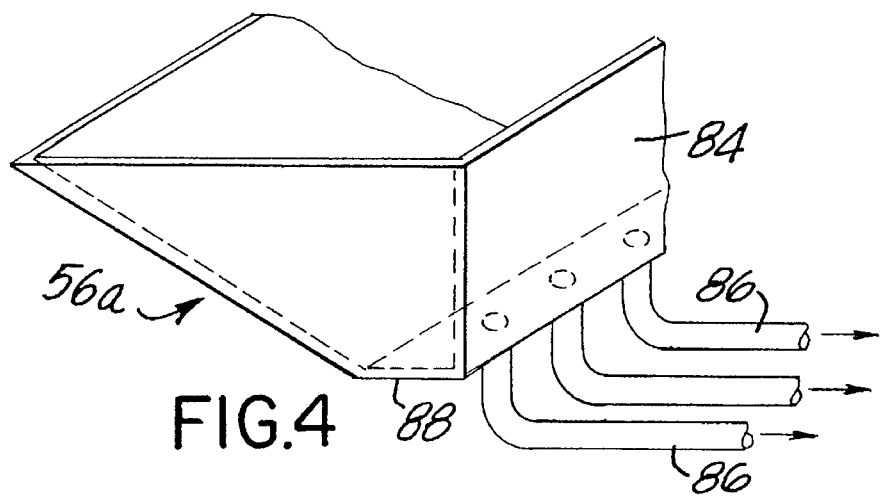
FIGS. 4, 5 and 6 are perspective views of various embodiments of sloped-bottom reservoir compartments.
Figure 5:
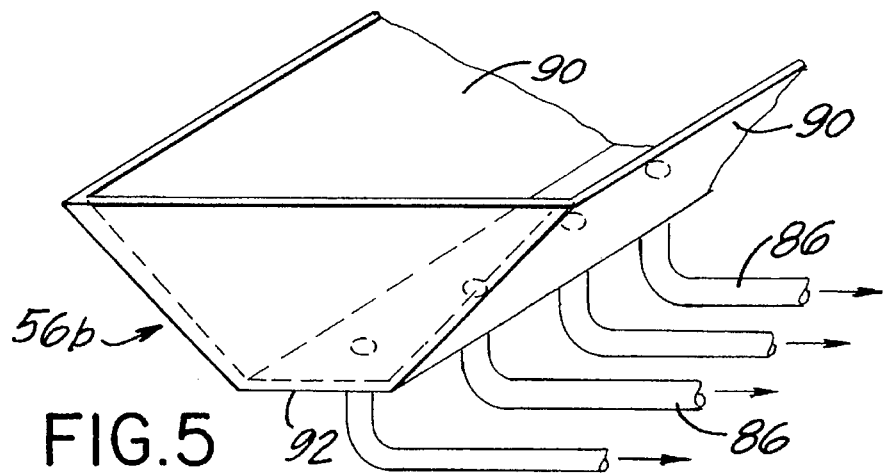
Figure 6:
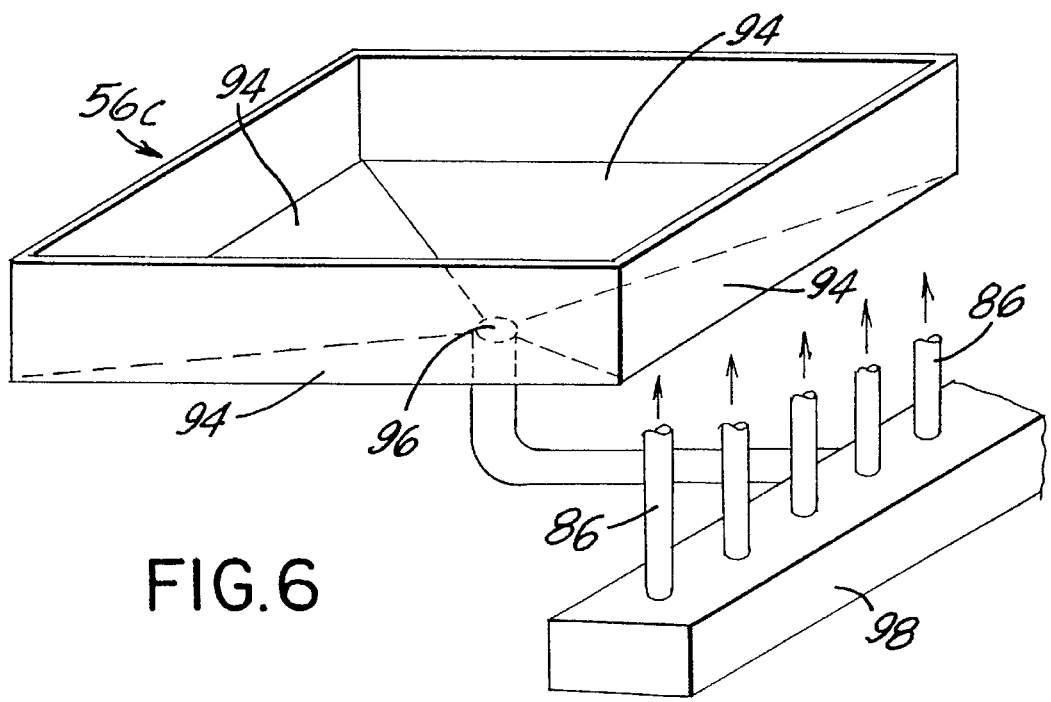

It is to be noted that a battery for use in a road vehicle must operate even when tilted quite severely in any direction. Therefore, in order to ensure that electrolyte 24 is always available at outlet port 34, the larger compartment 18 is advantageously provided with a sloped bottom 36 leading towards said outlet port. Several forms of such a sloped bottom are shown in FIGS. 4, 5 and 6.

Pumping means 38 are provided for circulating the electrolyte 24. In the embodiment shown, means 38 pumps an interruptable supply of compressed air 40.

Cooling fluid conduit 42 passes through smaller compartment 16 and extracts heat from the hot electrolyte 24 therein. Water, polyglycol, or other heat-transfer liquid is used as the cooling fluid 44.

Pumping means 46, such as a small, electrically-driven pump 48, are also provided for circulating the cooling fluid 44 through the conduit 42 and through radiator means 47, arranged for the disposal of heat therefrom.

It is to be noted that the pump 40 and means 38 for pumping compressed air may be powered from battery 12, if necessary, by means of a transformer (not shown); consequently, there is no need for an auxiliary battery.

In the course of battery operation, some water is lost by the electrolyte 24 through evaporation. A filler pipe 50 connected to the smaller reservoir compartment 16 is therefore provided, to allow replacement of this lost water and thereby to prevent electrolyte KOH concentration from rising above a desired limit.

Figure 2:
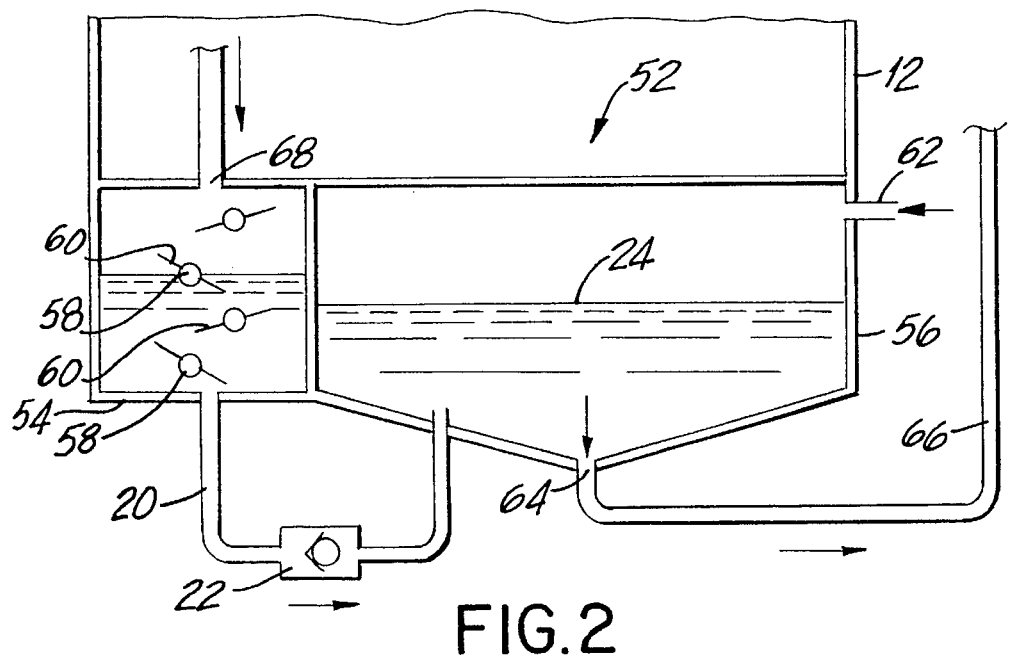
FIG. 2 is a fragmented end view of a second, preferred embodiment of the reservoir.

Referring now to FIG. 2, there is seen a preferred embodiment of an electrolyte reservoir 52, divided into a smaller compartment 54 and a larger compartment 56. A cooling fluid conduit 58 is provided with an extended outer surface such as the fins 60 shown, to increase the rate of heat transfer per unit length of conduit 58. The larger compartment 56 comprises a gas-tight vessel, and electrolyte circulation pumping means includes an inlet 62 in larger compartment 56, for supplying compressed air thereto. In operation, increased pressure in compartment 56 and closure of valve 22 result in the following cycle:

a) electrolyte 24 is driven through a lower outlet port 64, through a cooled electrolyte liquid flow path 66, and into the cell electrolyte holding volume 28, seen in FIG. 1;

b) electrolyte level in the volume 28 rises, due to the added electrolyte; and c) electrolyte 24 flows from the volume 28 to the smaller compartment 54 through inlet port 68.

On cessation of pumping, hydrostatic pressure of the electrolyte held in smaller compartment 54 causes flow through the valve 22 to raise the level of electrolyte 24 in the larger compartment 56 to its former height.

It has been found that electrolyte pumping is best done in short bursts. In a battery test, about 10 cc of electrolyte was circulated for 5 seconds, followed by a 10-second rest period, during which the electrolyte levels in the two compartments equalized. Thus, four pumping periods circulating a total of 40 cc of electrolyte took place per minute. Tubing having an inner diameter of 4 mm was used in the electrolyte circulation flow path.

Figure 3:
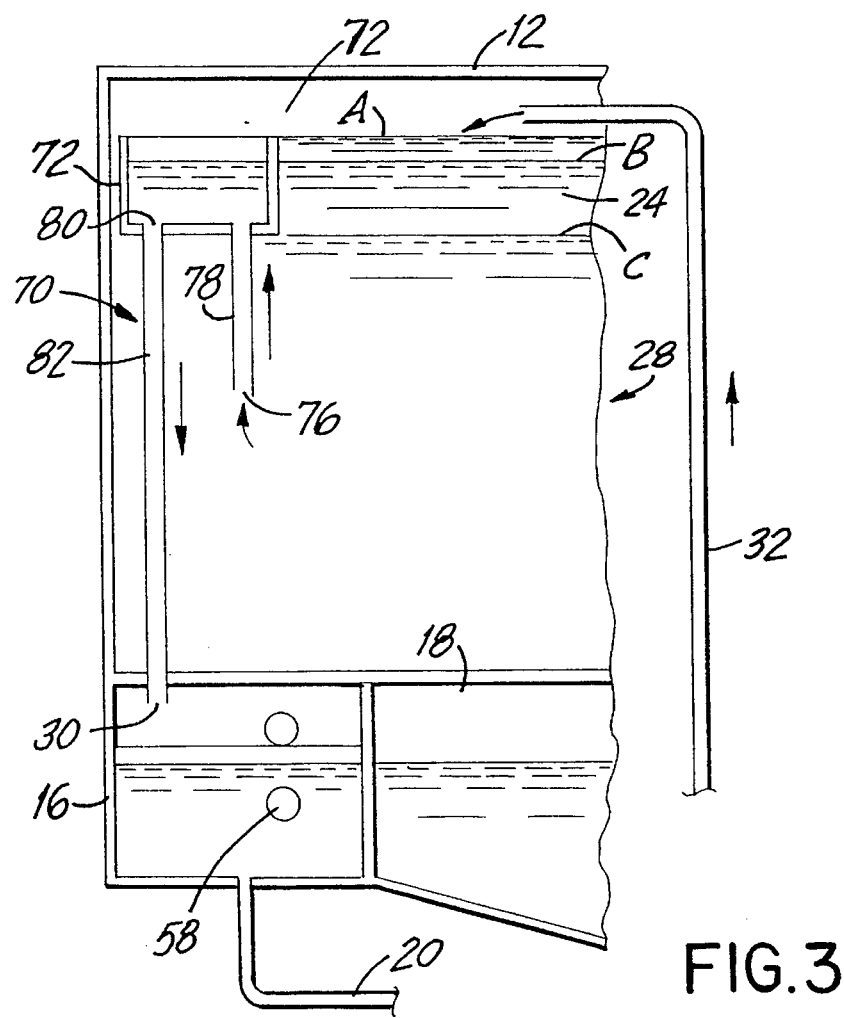
FIG. 3 is an end view of a preferred embodiment of the warm electrolyte liquid flow path.

FIG. 3 shows a preferred form of a warm electrolyte liquid flow path 70. Path 70 has the form of an unequal-leg inverse U, the upper bend of the U being a small tank 72 which is exposed to air pressure inside the battery 12 above electrolyte levels A, B, C. Path 70 is arranged to allow entry of warm electrolyte 24 from the electrolyte-holding volume 28 of cell 12 into the open lower portion 76 of the shorter leg 78 of the U. Electrolyte level rises as electrolyte enters via flow path 32, causing electrolyte to flow upwards into shorter leg 78 and then into small tank 72. Electrolyte from tank 72 enters the upper opening 80 of long leg 82 of the U, and flows therethrough under gravity to enter the smaller compartment 16 through an inlet port 30. Tank 72 acts to prevent unwanted siphoning of the electrolyte because it is open to air and accepts overflow, should the volume 28 be full.

If the electrolyte level reaches the height marked A, electrolyte overflows the walls of the small tank 72 and then flows down the long leg 82 of the U. The normal static electrolyte level is the height marked C. As electrolyte enters from flow path 32, electrolyte level rises to B; then, as it flows out through path 70, the level goes back down toward C.

Illustrated in FIGS. 4, 5 and 6 are several forms of a sloped bottom for the larger reservoir compartment 56.

The embodiment shown in FIG. 4 includes a compartment 56a, sloped towards one side wall 84. Distribution tubes 86 collect electrolyte from a lower surface 88.

FIG. 5 depicts an embodiment including a compartment 56b, having two sloped side walls 90. Again, distribution tubes 86 collect electrolyte from a lower surface 92.

Compartment 56c, shown in FIG. 6, has a manifold 98. The bottom surface of the compartment comprises four sloped surfaces 94, and the electrolyte is drained into a single port 96. Distribution tubes 86 feed electrolyte to the cells 12.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electrolyte cooling device for use in combination with a multi-cell metal-air battery, said device comprising:

an electrolyte reservoir divided into a first compartment and a second compartment, said compartments being connected by a valve arranged to periodically allow flow of electrolyte from said first compartment to said second compartment, wherein said first compartment is of smaller volume than said second compartment, and said second compartment comprises a gas-tight vessel in fluid communication with air compression means for effecting electrolyte pumping of cooled electrolyte into each cell, and wherein said air compression means comprises an inlet in said second compartment for supplying bursts of compressed air thereto, whereby at the closure of said valve increased air pressure in said second compartment periodically drives electrolyte therefrom;

a warm electrolyte liquid flow path leading from an electrolyte-holding volume of each cell of said battery to an inlet port of said first compartment;

a cooled electrolyte liquid flow path leading from an outlet port of said second compartment to said electrolyte-holding volume of each said cell of said battery;

at least one cooling fluid conduit passing through said first compartment for extracting heat from hot electrolyte contained therein; and pumping means for circulating a cooling fluid through said conduit and through radiator means arranged for the disposal therefrom of heat.

2. An electrolyte cooling device as claimed in claim 1, wherein said larger compartment is provided with a sloped bottom leading towards said outlet port.

3. An electrolyte cooling device as claimed in claim 1, wherein said cooling fluid conduit is provided with an extended outer surface.

4. An electrolyte cooling device as claimed in claim 1, wherein said warm electrolyte liquid flow path is in the form of an unequal-leg inverse U, the upper bend of said U being a small tank inside the battery above electrolyte level, whereby said small tank is supplied with electrolyte in either a first or a second flow path, a first flow path when rising electrolyte levels in said electrolyte-holding volume of said cell cause pressurized electrolyte to flow upwards into said small tank from the shorter leg of the U, and a second flow path when electrolyte level in the cell rises above the top edge of said small tank and overflows thereinto, continuation of both flow paths being the exiting of electrolyte from the small tank via the upper opening of said long leg and flowing down said long leg under gravity to enter said smaller compartment through said inlet port;

whereby electrolyte siphoning is prevented and a cell electrolyte overflow path is provided.

5. An electrolyte cooling device as claimed in claim 1, further provided with a filler pipe to allow replacement of water lost by the electrolyte through evaporation.

\* \* \* \* \*